United States Patent
Kulik et al.

(10) Patent No.: US 9,098,809 B2
(45) Date of Patent: Aug. 4, 2015

(54) SYSTEM AND METHOD OF SEMI-AUTOMATED VELOCITY-BASED SOCIAL NETWORK MODERATION

(71) Applicant: Internet Brands, Inc., El Segundo, CA (US)

(72) Inventors: Terrence Kulik, Torrance, CA (US); Zhida Sun, San Gabriel, CA (US)

(73) Assignee: Internet Brands, Inc., El Segundo, CA (US)

( * ) Notice: Subject to any disclaimer, the term of this patent is extended or adjusted under 35 U.S.C. 154(b) by 0 days.

(21) Appl. No.: 14/475,207

(22) Filed: Sep. 2, 2014

(65) Prior Publication Data
US 2015/0066832 A1 Mar. 5, 2015

Related U.S. Application Data

(60) Provisional application No. 61/872,584, filed on Aug. 30, 2013.

(51) Int. Cl.
*G06F 21/00* (2013.01)
*G06N 5/04* (2006.01)
*H04L 29/08* (2006.01)
*H04L 29/06* (2006.01)
*G06F 21/31* (2013.01)
*G06F 21/55* (2013.01)
*G06F 21/50* (2013.01)

(52) U.S. Cl.
CPC .............. *G06N 5/04* (2013.01); *G06F 21/316* (2013.01); *G06F 21/552* (2013.01); *G06F 21/554* (2013.01); *H04L 63/14* (2013.01); *H04L 63/1408* (2013.01); *H04L 63/1425* (2013.01); *H04L 67/10* (2013.01); *G06F 21/50* (2013.01); *G06F 2221/2133* (2013.01); *H04L 63/1416* (2013.01)

(58) Field of Classification Search
CPC ......... H04L 63/14; G06F 21/05; G06F 21/03; G06F 2221/2133
USPC .................................. 709/204–207, 217–229
See application file for complete search history.

(56) References Cited

U.S. PATENT DOCUMENTS

| | | | | |
|---|---|---|---|---|
| 2011/0256932 | A1* | 10/2011 | Kim et al. | 463/42 |
| 2011/0320816 | A1* | 12/2011 | Yao et al. | 713/171 |
| 2014/0108640 | A1* | 4/2014 | Mathis | 709/224 |

OTHER PUBLICATIONS

Detection of MMORPG Bots Based on Behavior Analysis by Thawonmas et al; Publisher: ACM; Year: 2008.*

(Continued)

*Primary Examiner* — Madhuri Herzog
(74) *Attorney, Agent, or Firm* — Rosenberg, Klein & Lee (57) ABSTRACT

A method and system of detecting the activity of "bots" in an online community, by measuring the time elapsed between user actions and comparing this time to a timespan established as normal for users performing the same user actions without the assistance of bots. The timespan may be adjusted when other suspicion characteristics are detected. When detecting actions suspected to be bot-assisted, the method and system respond by executing one or more response instructions against the user suspected of using the bot, with the aim of preventing further bot activity. The response instructions are stored by associating them with a type of user action and a total number of suspect user actions. As a result, the response instructions may be set to increase in severity with each additional suspect act by a user.

19 Claims, 3 Drawing Sheets

(56) References Cited

OTHER PUBLICATIONS

Detection of Auto Programs for MMORPGs by Kim et al; Publisher: Springer-Verlag Berlin Heidelberg; Year: 2005.*

Identifying MMORPG Bots: A Traffic Analysis Approach by Chen et al; Publisher: EURASIP Journal on Advances in Signal Processing; Year: 2009.*

Gianvecchio, Steven, et al. "Battle of botcraft: fighting bots in online games with human observational proofs." Proceedings of the 16th ACM conference on Computer and communications security. ACM, 2009.*

* cited by examiner

```
set t_2 = presentTime()
for each useraction UA
    set t_1 = t_2
    set t_2 = presentTime()
    // S120
    set T = determineTimespan(UA.type)
    // S130
    if t_2 - t_1 ≥ T
        // S150
        processUserAction(UA)
    else
        // S160 to S180
        processViolation(UA)
```

FIG. 3B

```
set t_2 = presentTime()
set t_3 = presentTime()
set T_A = 0
for each useraction UA
    set t_1 = t_2
    set t_2 = t_3
    set t_3 = presentTime()
    // S120
    set T_B = determineTimespan(UA.type)
    set T = T_A + T_B
    // S130
    if t_3 - t_1 ≥ T
        // S150
        processUserAction(UA)
    else
        // S160 to S180
        processViolation(UA)
```

SYSTEM AND METHOD OF SEMI-AUTOMATED VELOCITY-BASED SOCIAL NETWORK MODERATION

CROSS-REFERENCE TO RELATED APPLICATIONS

This application claims the benefit of U.S. Provisional Application No. 61/872,584, filed on Aug. 30, 2013 in the US Patent and Trademark Office. All disclosures of said provisional application are incorporated herein by reference.

BACKGROUND OF THE INVENTION

1. Field of the Invention

The present invention relates to a system and method of detecting and responding to undesired user actions in an online community. In particular, although not exclusively, an algorithm compares the time elapsed between a user's actions to the time a human normally takes to conduct the same actions, and responds in an increasingly severe manner when the time elapsed is abnormally fast.

2. Description of the Related Art

Users who wish to exploit an online community for their own benefit often use software, frequently referred to as "scripts" or "bots," to increase their activity rate. These bots can allow a user to create comments within every topic in the community, apply ratings to all comments, or send personal messages direct to every user, all in a matter of seconds. Bots rarely serve a legitimate purpose in a community, but are employed instead for undesirable uses; they can also overwhelm an administrator (a person with authority over the community), who could manually detect and counter objectionable activity when performed at a slower speed. It has therefore long been desirable to curtail the use of bots, particularly in an automated fashion which can match the speed of the bots.

One existing system of curtailing bots is a CAPTCHA ("Completely Automated Public Turing test to tell Computers and Humans Apart"), which generates a challenge question of some sort which must be answered before allowing a comment, or post, to be added to the community. These questions are designed to be simple for a human to answer, but confusing to a computer, thus preventing a bot from accomplishing its task. A common CAPTCHA system presents a visually distorted image of a word, which the user must type back correctly. This solution, however, delays the comments of all users, not just malicious users or even suspected malicious users, and can be unnecessarily aggravating as a result. For this reason, CAPTCHAs are almost never employed for speedy user activity such as the rating of comments, where the delay can more than triple the time it takes to accomplish the task. Also, certain users may be confused by the questions and thus be mistaken for a bot, blocking honest activity; for instance, a visually-challenged user may be stymied by a visually distorted image CAPTCHA.

If a user can only make comments or engage in other activity after identifying him or herself in some way (for instance, via registration for a user account, or via the logging of an IP address or MAC address), an additional solution presents itself. Because a primary advantage of a bot is its ability to increase the speed by which a user can comment (or take other actions), a system might detect bots by watching for a single party making a second comment "too quickly" after a first comment. These systems then block the second comment. However, this is difficult to apply to other actions such as ratings, which are already performed quickly and for which it is difficult to judge what interval is "too quick."

Additionally, both prior art solutions respond solely by preventing the comment creation or other activity from occurring, and perhaps preventing further activity for a designated period. Without direct human intervention, the prior art solutions deliver the same response to both an honest user acting in error for the first time and a bot that has been acting against the community for months.

It is therefore desirable to develop a system that can consider not only comments but also other community activity in the automatic detection of bots.

It is additionally desirable to develop a system that can react in a stronger manner the more often a user engages in bot-like activity.

It is additionally desirable to develop a system that can respond flexibly to possible bot activity without losing the speed of automatic detection.

SUMMARY OF THE INVENTION

While not limited thereto, an embodiment of the present invention is directed to a method of detecting and responding to unwanted user actions in a community, including detecting a plurality of user actions performed by a user, the plurality of user actions comprising a first user action and a last user action; determining a timespan T; comparing the timespan T to the time elapsed between the first user action and the last user action; and if the time elapsed is less than the timespan T, responding to the action, wherein each user action can be categorized by type, wherein each type of user action is associated with a timespan $T_X$ in a database, wherein the determining of the timespan T comprises determining the type of the last user action and determining the timespan $T_X$ associated with the type of the last user action, and wherein the responding to the action comprises recording information of the last user action to a violation log associated with the user.

According to an aspect of the invention, a timespan $T_X$ associated with at least one type of user action may be set by performing a user action of the type of user action, measuring and recording the time interval between a starting time and a completion time of the performing of the user action, repeating the first two operations at least once, such that a plurality of time intervals for user actions of the type of user action are recorded, and calculating the timespan $T_X$ such that at least 80% of the plurality of time intervals are greater than $T_X$.

According to an aspect of the invention, calculating of the timespan $T_X$ may include calculating a normal distribution of the plurality of time intervals, and setting $T_X$ to either 2.5 or 3.0 standard deviations below the mean on the normal distribution of the plurality of time intervals.

According to an aspect of the invention, the plurality of user actions may further include one or more intermediary user actions, and the determining of the timespan T may further include, for each of the one or more intermediary user actions, determining a type of the intermediary user action and a timespan $T_X$ associated with the type of the intermediary user action, and generating a sum of all timespans $T_X$ determined from the last user action and the one or more intermediary user actions.

According to an aspect of the invention, all of the plurality of user actions may have the same type.

According to an aspect of the invention, the determining of the timespan T may further include detecting a characteristic of the user, the characteristic comprising an IP address, location, browser, or suspicion flag, and, if the characteristic of the user is designated as a suspicious characteristic or not recognized, increasing the timespan T.

According to an aspect of the invention, a rule set may include a plurality of rules, each rule including a number value and one or more response instructions, and the responding to the action may further include determining a number of user actions for which information has been recorded in the violation log associated with the user, matching the number of recorded user actions to the number value for a rule in the rule set, and executing the one or more response instructions of the matched rule.

According to an aspect of the invention, a rule set may include a plurality of rules, each rule including a number value, a type value, and one or more response instructions, and the responding to the action may further include determining a number of user actions of the type of the last user action for which information has been recorded in the violation log associated with the user, matching both the number of recorded user actions and the type of the last user action to the number value and type value, respectively, for a rule in the rule set, and executing the one or more response instructions of the matched rule.

According to an aspect of the invention, at least one response instruction may include blocking the last user action, blocking all user actions of the type of the last user action performed by the user for a set time period, blocking all user actions performed by the user for a set time period, and/or setting a suspicion flag for the user to true for a set time period.

While not limited thereto, an embodiment of the present invention is directed to a system of detecting unwanted user actions in a community, including a computer readable memory, a transceiver in communication with the memory and further in communication with a network, and a processor in communication with the memory and configured to execute one or more of the above methods.

While not limited thereto, an embodiment of the present invention is directed to a non-transitory computer readable medium encoded with processing instructions for implementing one or more of the above methods.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

It is noted that the section headings of this detailed description are for convenience only and should not be interpreted as limiting the scope of the invention.

1. Glossary

User: An individual participant in an online community. Includes participants who act through, or with the assistance of, a bot or bots (see below).

User action: A single action, performed through a user interface of an online community, which, if not interrupted, alters the data in one or more computer readable memories on which the community is implemented. Example types of user action include creating a comment, viewing a comment, rating a comment, sending a personal message, and sending a friend request.

Bot: A software program designed to perform user actions in an automated fashion, in a manner simulating human activity.

To block: As in, "to block a user action." To prevent the alteration intended by the user action from having a lasting effect on the data. Example methods of blocking include interrupting the process or transmission of the user action such that the intended alteration to the data does not occur, or reversing the intended alteration such that the altered data is restored to its earlier state.

To log: As in, "to log information." To preserve the information in, or save the information to, a memory. Includes both short-term and long-term preservation. Synonym phrase: "record to a/the log." Distinguished from the noun "log."

2. Principles and User Actions of Online Communities

An online community, in particular a forum, has a plurality of users who use the community to interact with each other. A community may require that a user complete a registration process before the user may perform some or all user actions, this process involving provision of a user name or ID, in most cases a password, and perhaps other information. As an alternative to a registration process, a community might automatically identify a user by IP address or computer MAC address, or by yet some other method; in some communities, the user may have the option to select an identification method from multiple options such as those described above.

For the purposes of this description, a user "joins" the community when he or she first provides identifying information. It is important to note that the identifying information need have no association with any real-world qualities of the participating user—for instance, a user name need bear no resemblance to the corresponding user's actual name—so long as the same user can be expected to use the same identifying information consistently.

Communities may be divided into sub-communities, sub-sub-communities, and so forth. It will be appreciated by those skilled in the art that, although data such as user information may be shared between these sub-communities, the invention may be implemented in a subset of the sub-communities in a community, and furthermore that different embodiments or configurations thereof may be implemented in different sub-communities. Therefore, hereinafter the term "community" is treated as including sub-communities, and the term "sub-community" is treated as including sub-communities of sub-communities.

In an online community, one type of user action is the creation of comments; that is, a message of some sort that can be seen by other users, or in some cases by a subset thereof. These comments may contain text, embedded images or other media, hypertext links to other content, and/or attached files, among other options. Comments may be organized by "topic"—usually, a subject for discussion—in which case a comment may create a new topic or be a reply to an existing topic; some communities allow the same comment to serve both purposes. Most communities allow replies to any comment that created a topic (in some communities, the user instead replies "to the topic," although the difference may be purely semantic). In some communities, it is also possible to reply directly to comments that did not themselves create a topic. In some communities, comments may be made in reply to content created by the community owner, such as an article or a piece of digital artwork; the content then serves as the topic.

In many communities, a series of topics will be listed and partially displayed in a central location. The topics will be displayed using a summary of some sort, such as a title sentence, or a first few sentences of the comment or content that created the topic. A user may see the complete content of the topic by "viewing" it, usually by selecting a hypertext link associated with the topic. In communities that are not organized by topic, comments themselves may be displayed in the same way. Viewing a topic or comment may also display all replies to it, or just a subset thereof. In communities where viewing is a type of user action, the data altered is frequently a view counter which tracks how many times a topic or comment has been viewed, and which therefore increments with each view user action.

In some communities, the creation of a topic or comment may include the option to restrict which other users may see it. A topic or comment may be completely private (only the commenting user may see the comment), or partially private (a designated list or group of users may see it). If a user is restricted from seeing the topic or comment, the user cannot view it or see its complete content, and in most communities the user will not see it even partially in the summary of topics or comments. In some communities the user may see the restricted topic or comment in the summary but marked in some way that designates its contents as inaccessible, and will be unable to view the complete content.

Another type of user action may be "subscribing" to a topic or comment. When subscribed, the user will be alerted when new activity occurs in relation to the topic or comment. In most cases, this will mean a reply, although such activity may also include editing or deletion of the topic/comment or its replying comments. The alert might come in the form of email, text messages, personal messages within the community's software, another form of communication, or some combination, depending on not only the embodiment but the setting configuration that the user may have selected.

Other types of user actions may include tagging or rating a topic or comment. To "tag" a topic or comment is to apply a label by which the topics or comments can be organized—for instance, similar subject matter might be given the same tag. A topic or comment may also be rated based on its benefit to the community, using any number of methods such as a "thumbs up/thumbs down," a number of "stars," or a basic number rating. In some communities, one or both user actions may be limited to the administrators and moderators (described below), and/or to "friends" of the user who created the topic or comment (also described below).

A user may have the option to "befriend" other users. In most communities, a first user sends a "friend request," which is a type of user action, to a second user, which is a message that includes an option to accept the request. If the second user accepts the request, the first and second users are now "friends." Being friends with another user may have several benefits, usually mutually shared, which will vary from community to community but may include: the ability to see each other's partially private topics and comments, automatic subscription to each other's topics and comments, the ability to tag or rate each other's topics and comments, or the ability to send personal messages directly to each other, among other options.

A user may have a score, designed to indicate the user's importance to the community. This score can be based on one or more factors, which may include but are not limited to: number of friends, number of comments created, number of topics created, ratings of topics and comments created, number of replies others have made to topics and comments created, or number of subscriptions others have made to topics and comments created.

Many communities have one or more administrators; that is, people in charge of maintaining the community. An administrator may or may not also be treated as a user, but will have control over the community beyond that granted to most users, for the purpose of maintaining the community's operation. This control may, in various communities, include the ability to delete comments or topics regardless of creator, ban users, create new sub-communities, and change the settings and appearance of the community's interface, among many other possible abilities. In some communities, "moderators" also exist, with a subset of the abilities of administrators. Although the term "administrator" will be used exclusively hereinafter for convenience, a moderator may serve the same role in some embodiments of the invention. Also, although a single administrator is assumed hereinafter for convenience, the invention may be practiced with a plurality of administrators.

In an online community, a high quality and quantity of interaction is of benefit to the community, encouraging new users to join the community and existing users to remain. To encourage this interaction, it may be desirable to provide a score to users based on their contributions to this interaction. A score may influence a user's social prestige in the community, and may also grant other benefits, whether supplied via the forum software or otherwise.

Scoring is frequently automated based on an algorithm. Most such algorithms take into account the number of comments that a user creates. In some cases, a user might exploit such algorithms for a higher score by creating large numbers of comments with little or no benefit to the community, while another user who spends time creating thoughtful and beneficial comments will fall behind, even though the latter will bring more benefit to the community. If other user actions also increase a score, the same user, or accomplice users, might attempt to perform these user actions at a high rate as well, again without regard to whether they are performing the user actions in a manner that benefits the community.

Another user might create comments, or perform other user actions, deliberately designed for his or her own benefit rather than the benefit of the community. These users might create comments containing "spam"—that is, undesired advertisements for products or services which the user has been paid to promote. The comments might alternatively contain malicious content, such as links to virus-infested websites, or "troll" content designed to aggravate or harass other users in the community for no purpose beyond the amusement of the malicious user. Other behavior undesired by the community is also possible without using comments—for instance, personal messages with spam or malicious content, poor ratings applied to comments based not on the comments' content but simply to harass a specific user, or use of any and all available user actions to overload the resources of the hardware of the community and produce a Denial of Service attack.

The two types of users are not mutually exclusive, and indeed a higher score may provide benefits that will allow a user's malicious or spam-filled content to reach more viewers.

Both types of users, and others, may employ bots to achieve their desired personal benefits more quickly.

3. Detection of Unwanted User Actions

A system and method for detecting undesired user actions in an online community will now be described.

Each user in an online community may be assigned a log in a computer memory. Each user's log may be represented as a single data file or data unit, or divided into separate but associated sublogs. In embodiments where the log is divided into sublogs, a detection sublog may be devoted specifically to the detection method described in this section of the specification.

Figure 1:
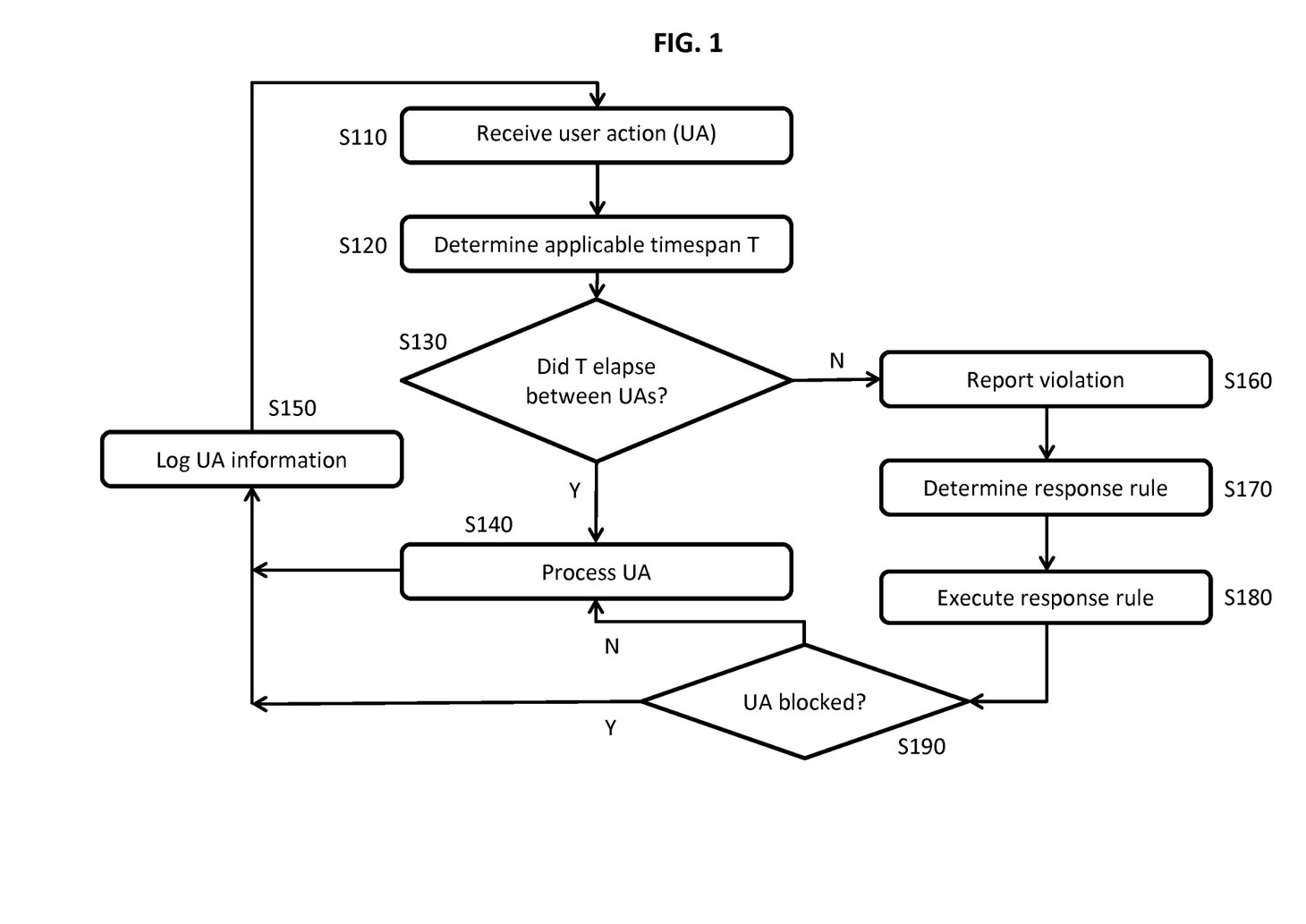
FIG. 1 is a flowchart depicting a method of detecting and responding to undesired user actions, according to an embodiment of the invention.

FIG. 1 is a flowchart depicting a method of detecting and responding to undesired user actions, according to an embodiment of the invention. It is noted that this figure depicts not only the detection method described in this section of the specification, but also the response method described in the following section, in combination.

When a user performs a user action for the first time, the instructions for that user action are received at S110. S120 and S130 are skipped for this first user action (the act of skipping these operations not depicted), which is processed at S140. At S150, the time $t_1$ of receipt of the first user action is logged—that is, stored to the user's log. Other information about the user action may also be logged. The method then returns to S110 for the next user action.

When the same user attempts to perform a second (last) user action, the user action is again received at S110. For this user action, a timespan T is determined at S120. Then, the time elapsed between the time $t_1$ of the first user action and the time $t_2$ of the second user action is compared to the timespan T at S130. If the timespan T has not elapsed between the first and second user actions—that is, if $t_2-t_1<T$—a violation is reported at S160. If the comparison at S130 determined that the timespan T did elapse, the user action is processed normally at S140. Regardless, the time of receipt of the second user action replaces the time of receipt of the first user action in the log at S150—that is, $t_2$ becomes the new $t_1$—and the detection process repeats.

It is noted that, in some embodiments, the operations of S120 and S130 may occur for the first user action as well, in a manner that takes into account the lack of a previous user action. For instance, in some embodiments, S120 may proceed normally. In some embodiments, because no time $t_1$ has been logged yet, S130 may recognize the lack of a $t_1$ and temporarily create a substitute $t_1$, which can be set to some time distant in the past, thus ensuring that $t_2-t_1<T$ is not true. In other embodiments, a $t_1$ is first logged before the method is run for the first time, when a user is recognized as present in the community but before the user has performed any user action (this operation not depicted in FIG. 1).

Figure 2:
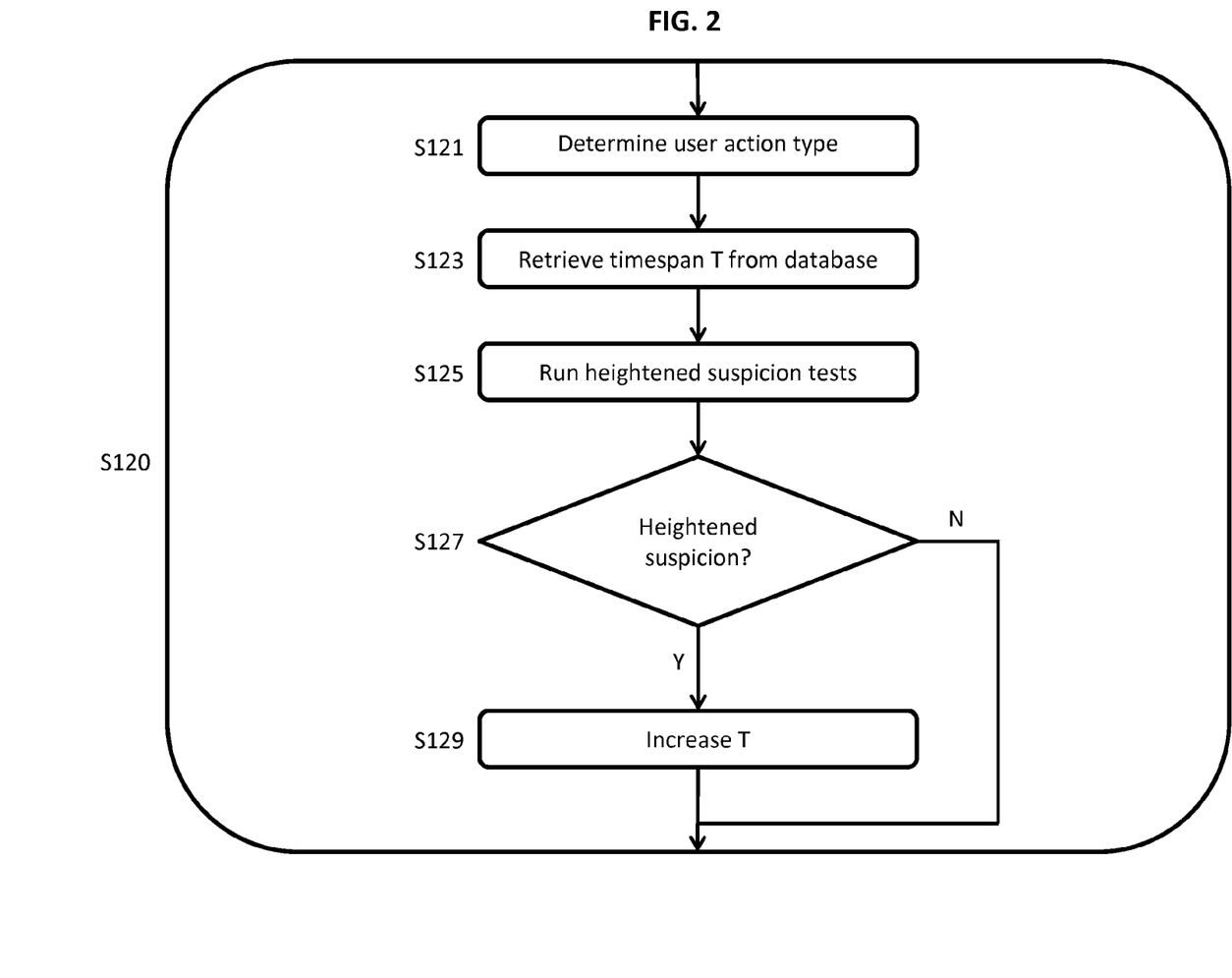
FIG. 2 is a flowchart elaborating on the operation S120 of FIG. 1, according to an embodiment of the invention.

FIG. 2 is a flowchart elaborating on the operation S120 of FIG. 1, according to an embodiment of the invention.

At S121, the type of the present user action is determined. A timespan T is then retrieved from a database at S123.

In some embodiments, multiple timespans $T_1, \ldots T_N$ are stored in the database. Although it is possible for all types of user action to share one timespan, in some embodiments each timespan is associated with a different type of user action. In some embodiments, each such timespan is based on the expected time for a normal user to complete the associated type of user action without assistance of a bot. For instance, if comment creation and comment rating are types of user actions available in the embodiment, comment creation may have a timespan $T_A$ while comment rating may have a timespan $T_B$. The timespan $T_B$ for comment rating will be shorter than the timespan $T_A$ for comment creation, if it can be expected that a normal user without assistance of a bot will be able to rate a comment faster than the same user can create a comment. When the second (last) user action occurs as described above, the method will examine whether the timespan associated with the second user action has elapsed since the first user action—for instance, if the second user action is a comment rating, $T_B$ will be used, and if $t_2-t_1<T_B$, a violation is reported.

Figure 3A:
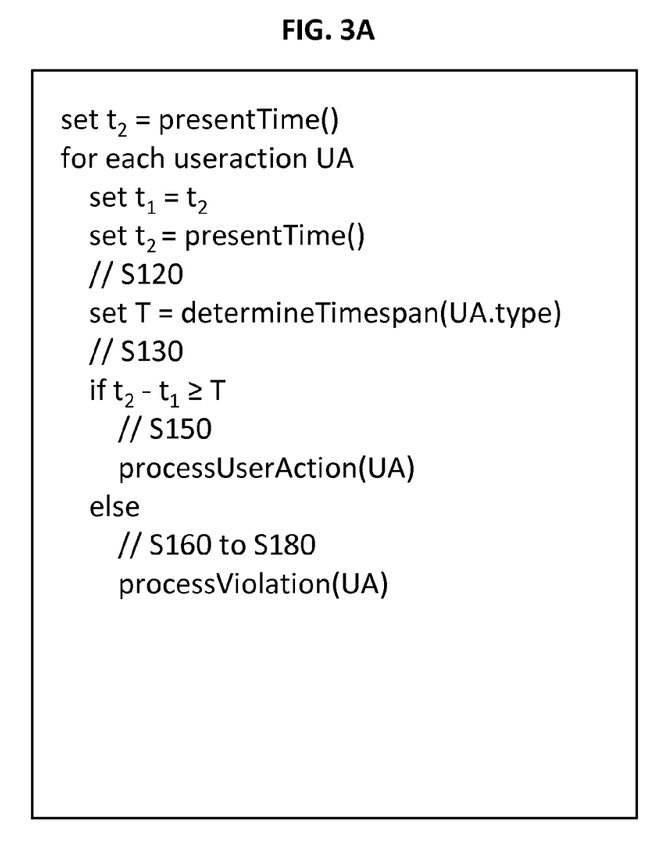
FIGS. 3A and 3B are two algorithms, depicted in the form of pseudocode, which determine whether a user action or actions occurred excessively fast, according to two embodiments of the invention.

FIG. 3A depicts pseudocode for the above algorithm, according to an embodiment of the invention. It is noted that this embodiment of the algorithm assumes that operations S120 and S130 will occur even on the first user action, and accounts for it by setting an appropriate value for $t_2$ in advance of the first user action.

In some embodiments, the second user action is not treated as the last user action, but an intermediary user action. In some such embodiments, the time $t_1$ of the first user action is not overwritten by the time $t_2$ of the second user action, but is preserved in the log until a third (last) user action by the same user has occurred. At the time $t_3$ of the third user action, the time since the first user action $(t_3-t_1)$ is compared to timespan T*2 at S130, and if $t_3-t_1<T*2$, a violation is reported at S160. In such embodiments, a single action where the user acts more quickly than predicted, such as when creating a very short comment, can be ignored as a fluke if the surrounding actions occur at a more normal pace. If specific timespans $T_1, \ldots T_N$ are provided for each type of user action, types for both the second (intermediary) user action and the third (last) user action are determined; then, the time elapsed between the first user action and third user action $(t_3-t_1)$ is compared to timespan $T_A+T_B$, where $T_A$ is the timespan for the second user action's type, and $T_B$ is the timespan for the third user action's type. (It will be necessary in such cases to log not only the time but the type and/or timespan of at least the second user action, such that $T_A$ can be retrieved or determined at the time of the third user action.) Once the comparison is completed, information on the first user action in the log is replaced by information on the second user action, information on the second user action is replaced by information on the third user action, and the detection process repeats.

Figure 3B:
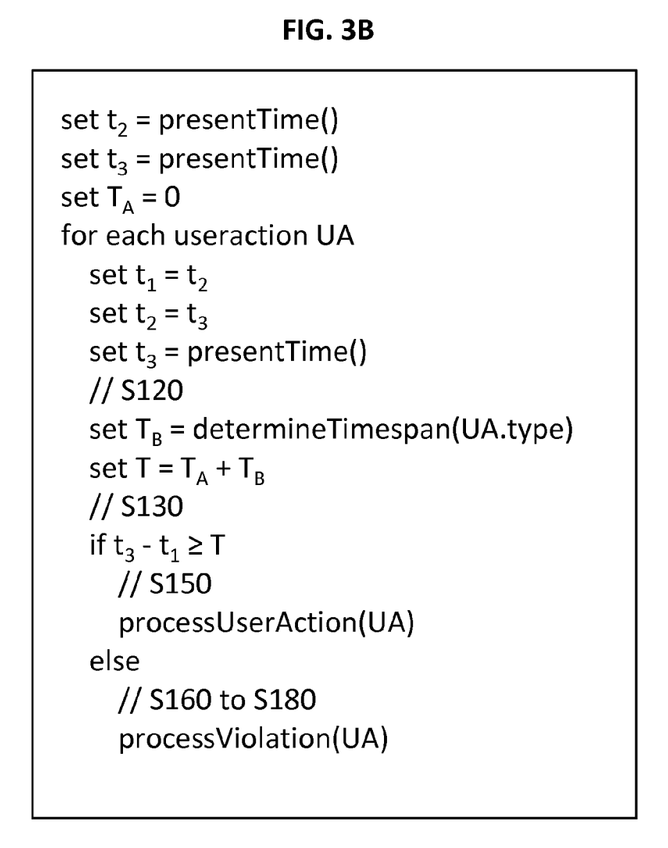

FIG. 3B depicts pseudocode for the above algorithm, according to an embodiment of the invention. It is noted that this embodiment of the algorithm assumes that operations S120 and S130 will occur even on the first and second user actions, and accounts for it by setting appropriate values for $t_2$, $t_3$, and $T_A$ in advance of the first and second user actions.

In a similar manner, embodiments which compare timespans of four or more user actions, including two or more intermediary user actions, may be implemented.

In some embodiments, each type of user action will be tracked separately, such that the method always considers only user actions of the same type for any cycle of the method. That is, if a user action of type A is received, the algorithm will determine how much time has elapsed since the last user action of type A, regardless of how many user actions of other types have occurred in the interim. In other words, no user actions not of type A will be considered as a first or intermediary user action when the last user action is of type A. If a user action of type B occurs between user actions of type A, the algorithm will determine how much time has elapsed since the last user action of type B in the same manner, ignoring the previous user action of type A and any other user actions not of type B.

In some embodiments, each timespan is determined through statistical analysis of the time it normally takes to complete the associated type of user action without the use of bots. Data for this analysis is collected at least partially in advance. In some embodiments, the data collected and recorded for the analysis includes a plurality of time intervals measured between the starting point and completion point of user actions of a specific type of user action, and can be collected by allowing one or more users to perform the user actions repeatedly. Such time intervals can be expected to vary wildly depending on the user interface of the community, and therefore completing such an analysis is beyond the scope of this description, but those skilled in the art will be able to conceive of numerous methods of collecting and analyzing the data. The timespan should be set such that the vast majority, for instance 90%, of user actions of a type of user action, when conducted without the use of bots, will take longer than the timespan associated with the type of user action. As one example, a normal distribution might be calculated of a plurality of time intervals measured from users creating comments without the use of bots, and a timespan for comment creation might be set to 2.5, or alternatively 3.0, standard deviations below the mean of the distribution.

In some embodiments, each timespan is determined through statistical analysis of the time it normally takes to complete the associated type of user action with the use of bots. Data for this analysis is collected at least partially in advance. In some embodiments, the data collected and recorded for the analysis includes a plurality of time intervals measured between the starting point and completion point of user actions of a specific type of user action, and can be collected by allowing a bot to perform the user actions repeatedly. Such time intervals can be expected to vary wildly depending on the user interface of the community, and therefore completing such an analysis is beyond the scope of this description, but those skilled in the art will be able to conceive of several methods of collecting and analyzing the data. The timespan should be set such that the vast majority, for instance 90% of user actions of a type of user action, when conducted with the use of bots, will take less time than the timespan associated with the type of user action. As one example, a normal distribution might be calculated of a plurality of time intervals measured from users creating comments with the use of bots, and a timespan for comment creation might be set to 2.5, or alternatively 3.0, standard deviations above the mean of the distribution.

In some embodiments, a combination of the above approaches is used to determine each timespan. Depending on the needs of the embodiment and the community, it may be preferable to catch more bots or allow more legitimate users, and one approach or the other will be emphasized, or used exclusively. For convenience, the rest of this description assumes that only data from user actions without bots has been collected and analyzed; those skilled in the art will be able to extrapolate the principles necessary to practice the invention using data from user actions with bots, or from a combination of the two.

In embodiments that do not consider intermediary user actions (e.g. FIG. 3A), it is generally preferable to use smaller timespans (e.g. 3.0 standard deviations below the mean time interval), to decrease the risk of false positives. In embodiments that consider one or more intermediary user actions (e.g. FIG. 3B), the risk of false positives is already lessened by the additional considered user actions and therefore larger timespans (e.g. 2.5 standard deviations below the mean time interval) may be acceptable. With a sufficient number of intermediary user actions considered, it may even be acceptable to use timespans where only 80% of user actions without the use of bots, or even less, will take longer than the timespan. It is also possible that the needs of the embodiment and the community will mean that it is preferable to avoid false negative than false positives, and therefore larger timespans are preferred regardless.

In some embodiments, the statistical analysis is refined by the system over time. An administrator may note "false positives"—legitimate user actions that were reported as violations. When a false positive is reported, the time elapsed between the first user action and the second user action is recorded as a new time interval in the collected data. The data is then reanalyzed based on the additional time interval.

In some embodiments, an administrator may adjust a timespan manually. This might be done by adjusting the timespan itself, or an element of the data (such as the mean) upon which it is based.

In some embodiments, the detection data or sublog for a given user may in some embodiments be erased for convenience when the user engages in no activity for a time-out timespan $T_Z$. Timespan $T_Z$ should be longer than the longest of timespans $T_1, \ldots T_N$, and in some embodiments may be set to several minutes.

Returning to FIG. 2, in some embodiments, additional tests might also be applied to detect a bot more easily, at S125. For instance, the community's user interface may have the capacity to detect the web browser being employed by a user performing a user action. Bots often simulate a web browser rather than use an existing browser; in such cases, the user interface will not recognize the type of browser being used. If the user interface does not recognize the browser, this may trigger a state of "heightened suspicion" at S127. If heightened suspicion is triggered, the relevant timespan may be increased at S129, for instance to 2.0 or even 1.5 standard deviations below the mean time for the associated type of user action. As a result, more violations will be generated when the user's web browser is not recognized.

It is also possible that the interface might recognize the user's "browser" as a simulated browser used exclusively by bots, in which case it may be desired that all user actions performed through this simulated browser be treated as violations regardless of the time elapsed between them. One way to implement this system is to increase the relevant timespan to an extremely high value, such as an hour or more; another way is to bypass the timespan comparison entirely, instead having operation S130 automatically return a "no" and continue to S160. Similar approaches may be applied when a user fails other tests that guarantee, or make highly likely, the presence of a bot.

Other information that may be tested might be the IP address of the user. If the IP address is from a range deemed suspicious, such as addresses known to be used by anonymizing software, or if the IP address cannot be detected or recognized, the detection method may operate on heightened suspicion. Similarly, if the user's computer is determined to be operating from a suspicious location, such as a nation whose residents have little reason to visit the particular community, or if the location cannot be detected or recognized, this too might result in heightened suspicion. As still another possibility, particular users might have all of their user actions under heightened suspicion due to past activity; this may be accomplished by activating a "suspicion flag" for the user, which may be set manually by an administrator, or automatically (this automatic process described further herein).

In some embodiments, different levels of suspicion—that is, different adjustments to the timespan—might result from different specific information and test results. For instance, a combination of an unknown browser and a suspect IP address at S125 may increase the timespan to 1.5 standard deviations below the mean at S129, where either one alone would only adjust the timespan to 2.0 standard deviations below the mean.

It is noted that, although the timespans and increased timespans have been generally described in terms of standard deviations below or above the mean, the timespans need not be calculated by the system in this manner, but could be determined upon based on other statistical calculations or other analysis, or even by trial and error. For instance, it may be the case that the data collected does not form a normal distribution, making the use of standard deviation calculations unhelpful, impractical, or impossible. Also, the timespans and/or increased timespans might be calculated on the spot from existing statistical data, or stored in the database in advance for normal suspicion and heightened suspicion for each type of user action.

4. Response to Unwanted User Actions

Returning to FIG. 1, when a violation is reported at S160, it is recorded to the log of the user who has committed the violation. A separate violation sublog may exist for such records. In some embodiments, the resulting record includes one or more of: the date and time of the violation, the type of user action that generated the violation, details of why the user action was determined to be a violation (such as the expected and actual timespans for the user actions taken, as well as any characteristics of the user or action that triggered heightened suspicion), and an identifier for the specific violating user action (such as a pointer to a memory).

The system then makes a decision of how to respond at S170, using response rules and the circumstances of the violation and previous violations by the same user. The response rules may be stored in a rule set in a database. In some embodiments, the rules may be implemented as a type value (that is, a value representing a type of user action), a number value, and one or more response instructions, and the database containing the rule set may be searched by type and number. The system decides on a response by finding the rule with a type value matching the type of user action that created the violation, and also with a number value matching the total number of violations listed in the user's log or violation sublog (or, in some embodiments, the total number of such violations resulting from the same type of user action). Once a matching rule is located, the one or more response instructions for the rule are executed at S180. In another embodiment, response rules only contain a number value and one or more response instructions, and only the total number of logged violations (or, the total number of logged violations resulting from the same type of user action) is considered when finding the appropriate response rule in the rule set.

In some embodiments, the number value for a response rule might be able to be set to a closed-ended or open-ended range; that is, "X to Y" for some numbers X and Y, which will match to any number between X and Y, or "X or more" for some number X, which will match to any number X or greater.

In various embodiments, possible response instructions may include the following:

The user may be alerted to the violation. The alert may come in the form of an email, a personal message using the community software, a popup in the browser, or any other convenient method which may be automated. If the rule also contains additional response instructions, the alert may inform the user that these instructions have been executed as well, or may inform the user of a subset of these instructions. The alert may include other information, such as how to contact an administrator to request withdrawal of the response.

An administrator may be alerted to the violation. The alert may come in the form of an email, a personal message using the community software, or any other convenient method which may be automated. If the rule also contains additional response instructions, the alert may inform the administrator that these instructions have been executed as well, or may inform the administrator of a subset of these instructions. The alert may include a copy of the record of the violation, or a link to said record in the user's log.

The present violating user action (that is, the last user action) may be blocked. Depending on characteristics of the community or its implementation, and on the specific type of user action, it may be preferable to do so by interrupting the data changes that the user action would cause, thus preventing them from occurring at all, or by reversing the changes after they have occurred. For instance, if the community's method of sending a friend request instantly alerts the recipient by email once successful, it may be preferable to interrupt friend requests, so an email related to a blocked friend request is not set. As another example, if the community hardware has limited short-term memory storage and cannot preserve the data for a large number of new comments, it may be preferable to reverse comments, so each new comment immediately copies to long-term memory storage without waiting for instructions whether to block them.

The user may be blocked from taking any further user actions of the type that generated the violation for a period of time. In many embodiments, this will include the present violating user action (that is, the last user action). This period of time might increase with repeat violations.

The user may be blocked from taking any further user actions of any type for a period of time. In many embodiments, this will include the present violating user action (that is, the last user action). This period of time might increase with repeat violations, and might even become indefinite (that is, the user is "banned" from the community).

The user may be designated as a "suspicious user" for a period of time. This period of time might increase with repeat violations, and might even become indefinite. While a user is designated "suspicious," further user actions by the user will be examined with heightened suspicion.

In some embodiments, one or more of the response rules may contain more than one response instruction; in such cases, all such response instructions for the given rule are executed together, in most cases in an effectively simultaneous manner. As one example, many other types of instructions may be combined with a user alert, informing the user of the response so that he or she understands that, for instance, the comment was blocked. As another example, an administrator may wish to receive an alert when more extreme responses such as a banning occur.

In some embodiments, one or all elements of the response rules may be set by an administrator in advance. In some embodiments, one or all elements of the response rules may be hard coded and may not be altered by an administrator.

In some embodiments, a user's violation sublog, or violation data in a main log, is erased after no new violations are added over the course of a designated period. In some embodiments, the violation sublog, or the violation data in the main log, may be amended or erased at the discretion of an administrator.

In some embodiments, the response rules for each number value may be different depending on the type of violating user action. As one example, it may be desirable to apply harsher responses against a user who employs a bot to create comments, if these comments risk crowding out legitimate comments. As another example, if false positives are more likely with comment ratings, it may be desirable to respond to the first few such violations with no response instructions at all, instead merely logging said violations in the user's log or violation sublog, and only employing further responses after numerous violations.

In some embodiments, each type of user action has its own violation number value in the violation sublog or data, which does not increment when a violation occurs due to another type of user action.

In some embodiments, an administrator may have the ability, at his or her discretion, to execute one or more additional response instructions, reverse one or more executed response instructions, and/or extend or abbreviate a period of time for one or more executed response instructions.

Returning to FIG. 1, once the response instructions of the applicable response rule have been executed, the system determines whether these or any previous executed instruction blocks the current user action, at S190. If the user action is not blocked, the user action is processed at S140. If the user action is blocked, the user action is not processed. In either case, the user action information is logged at S150 and the method returns to S110 to await the next user action.

5. Sample Configuration of the Invention and Benefits of Use

One possible embodiment and configuration will now be described in more detail as an example, to better depict the applications and benefits of the invention. In the presentation of this implementation, the rules will all be organized by user action type and then by number, and presented as "1) response instruction(s) for first violation, 2) response instruction(s) for second violation," and so forth. A number value of "one or more" will be presented as "1+," and so forth.

A particular community has suffered from an overwhelming number of spam comments. The spammers mostly appear to operate from the Republic of Sherwood, although the community also has legitimate users in that nation. Additionally, some new users have suspiciously high user scores. The user score in this community is calculated in part based on the user's comments and any replies to those comments, and on the user's number of friends. The community has no rating or tagging system, and there is no sign that anyone is abusing other features of the community.

The administrator decides not to take any more chances with the spam, and sets the comment creation rules to 1+) User Alert+Admin Alert+Block All Actions (indefinite). Although this may be harsh, he believes it will be easier to reverse bans applied to legitimate users than continue to chase spammers who have gotten through. This will also assist in preventing both initial and reply comments designed to inflate scores.

To further prevent score inflation, the administrator sets the friend request rules to 1) User Alert+Block Action, 2+) User Alert+Admin Alert+Block Action Type (1 day).

The administrator wants to be ready if the spammers start using personal messages for spam, and sets the personal message rules to 1+) Admin Alert. If he receives a large number of alerts for personal message violations, he plans to revisit those rules, but for now he plans only to observe.

The administrator sees no present need to have rules for views or subscriptions, which in this community have no effect on score, and turns them off.

Finally, the administrator sets Sherwood as a suspicious location, which will result in a timespan increase from 2.5 to 2.0 standard deviations.

After a week of use, the administrator has received a high number of false positives for friend requests, resulting in several legitimate users who are unable to request friends for extended periods; it appears that the default estimates for the timespans were incorrect. He therefore manually decreases the timespan associated with friend requests from its default setting of 5 seconds to 3 seconds. In this particular embodiment, the heightened suspicion timespan for friend requests automatically adjusts accordingly, though in other embodiments he might have needed to change that manually as well.

Over 50 users have been banned automatically over comment creation violations, and the administrator has confirmed from the logs that the vast majority were attempting to post spam, although he has reversed the bans of a few legitimate users (most of them from Sherwood, due to the heightened suspicion settings) and erased their violation sublogs with apologies.

As he predicted, he has now started to receive alerts from personal message violations. He has already banned a few violating users manually after reviewing their alerts, but the number is starting to increase, so he changes the personal message rules to 1) User Alert+Admin Alert+Block Action Type (1 day), 2+) User Alert+Admin Alert+Block All Actions (indefinite).

6. Other Applications of the Invention

The methods and other processing instructions necessary to implement the system described herein may all be encoded on a non-transitory computer readable medium, with the instructions to be executed using one or more processors.

A processor may be configured to execute the methods and other processing instructions described herein. The processor may be in communication with a computer readable memory storing the instructions; the memory may also store software or data implementing other features of the community. The memory may also be in communication with a transceiver, which in turn is in communication with a network, such as a LAN or the Internet.

Although the invention has been described largely in terms of an online community or forum, other applications are possible. As one example, websites with user-generated content frequently measure the number of views of that content, and reward the creator of that content appropriately for the increased traffic and, by extension, ad revenue. Bots can abuse this system by repeatedly viewing the same content at a high rate, and it is desirable to detect the views of these bots such that further views from the same bot are blocked; that is, such that the view counter is not incremented by the act of a bot viewing the content. As another example, various review websites may offer users the opportunity to rate products, and a bot might be programmed to give the highest rating to every product made by a given company; this too is desirable to prevent. Other applications can also be conceived by those skilled in the art, and are within the spirit and scope of the invention.

Although a few embodiments of the present invention have been shown and described, it would be appreciated by those skilled in the art that changes may be made in this embodiment without departing from the principles and spirit of the invention, the scope of which is defined in the claims and their equivalents. In particular, all or some of the above mentioned embodiments may be selectively combined with each other.

What is claimed is:

1. A method of automatically detecting and responding to unwanted user actions in a community linked by an online communication network, the method comprising:
    (a) executing a processor coupled to the network to automatically detect a plurality of user actions performed by a user, the plurality of user actions including a first user action and a last user action;
    (b) determining a value for a timespan parameter T;
    (c) comparing the timespan parameter T value to the time elapsed between the first user action and the last user action; and
    (d) when the time elapsed is less than the timespan T for a user action, executing a processor coupled to the network to automatically actuate a response to said user action, the response including generation and transmission of an electronic alert through the network to at least one member of the community;
    wherein each user action is categorized by type,
    wherein each type of user action is associated with a corresponding value for the timespan parameter T in a database having a non-transitory computer readable medium,
    wherein the determining of the timespan T includes executing a processor coupled to the network for:
        determining the type of the last user action, and
        adaptively determining the corresponding value of the timespan parameter T based on the type of the last user action, and
    wherein the responding to the action includes recording information of the last user action to a violation log associated with the user, the log being stored in a non-transitory computer readable medium.

2. The method of claim 1, wherein a value for the timespan parameter T to be associated with at least one type of user action is set by:
    (1) carrying out a user action of the at least one type,
    (2) measuring and recording the time interval between a starting time and a completion time of the performing of the user action,
    (3) repeating (1) and (2) a plurality of times, such that a plurality of time intervals for user actions of the type of user action are recorded, and
    (4) calculating the parameter T value such that at least 80% of the plurality of time intervals are greater than said parameter T value.

3. The method of claim 2, wherein the calculating of the timespan parameter T value includes:
    calculating a normal distribution of the plurality of time intervals, and
    setting the parameter T value to 2.5 standard deviations below the mean on the normal distribution of the plurality of time intervals.

4. The method of claim 2, wherein the calculating of the timespan parameter T value includes:
    calculating a normal distribution of the plurality of time intervals, and
    setting the parameter T value to 3.0 standard deviations below the mean on the normal distribution of the plurality of time intervals.

5. The method of claim 1, wherein the plurality of user actions consists of the first user action and the last user action.

6. The method of claim 1, wherein the plurality of user actions further includes one or more intermediary user actions, and
    wherein the determining of the timespan parameter T value further includes:
        for each of the one or more intermediary user actions, determining a type of the intermediary user action,
        for each of the one or more intermediary user actions, determining a timespan parameter T value associated with the type of the intermediary user action, and
        generating a sum of all timespans parameter T values determined from the last user action and the one or more intermediary user actions.

7. The method of claim 1, wherein all of the plurality of user actions have the same type.

8. The method of claim 1, wherein the determining of the timespan parameter T value further includes:
    detecting a characteristic of the user, the characteristic including an IP address, location, browser, or suspicion flag; and
    if the characteristic of the user is designated as a suspicious characteristic, increasing the timespan parameter T value.

9. The method of claim 1, wherein the determining of the timespan parameter T value further includes:
    detecting a characteristic of the user, the characteristic including an IP address, location, browser, or suspicion flag; and
    if the characteristic of the user is not recognized, increasing the timespan parameter T value.

10. The method of claim 1,
    wherein a rule set includes a plurality of rules, each rule including a number value and one or more response instructions, and
    wherein the responding to the action further includes:
        determining a number of user actions for which information has been recorded in the violation log associated with the user,
        matching the number of recorded user actions to the number value for a rule in the rule set, and
        executing the one or more response instructions of the matched rule.

11. The method of claim 1,
    wherein a rule set includes a plurality of rules, each rule including a number value, a type value, and one or more response instructions, and
    wherein the responding to the action further includes:
        determining a number of user actions of the type of the last user action for which information has been recorded in the violation log associated with the user,
        matching both the number of recorded user actions and the type of the last user action to the number value and type value, respectively, for a rule in the rule set, and
        executing the one or more response instructions of the matched rule.

12. The method of claim 11, wherein at least one response instruction includes blocking the last user action.

13. The method of claim 11, wherein at least one response instruction includes blocking all user actions of the type of the last user action performed by the user for a set time period.

14. The method of claim 11, wherein at least one response instruction includes blocking all user actions performed by the user for a set time period.

15. The method of claim 14, wherein the set time period is infinite.

16. The method of claim 11, wherein at least one response instruction includes setting a suspicion flag for the user to true for a set time period.

17. The method of claim 16, wherein the set time period is infinite.

18. A system of automatically detecting unwanted user actions in a community linked by an online communication network, the system comprising:
- a non-transitory computer readable memory;
- a transceiver coupled to the memory through the network; and
- a processor coupled to the memory through the network and configured to execute:
    - (a) automatically detecting a plurality of user actions performed by a user, the plurality of user actions including a first user action and a last user action;
    - (b) determining a value for a timespan parameter T;
    - (c) comparing the timespan parameter T value to the time elapsed between the first user action and the last user action; and
    - (d) when the time elapsed is less than the timespan T for a user action, executing a processor coupled to the network to automatically actuate a response to said user action, the response including generation and transmission of an electronic alert through the network to at least one member of the community;
- wherein each user action is categorized by type,
- wherein each type of user action is associated with a corresponding value for the timespan parameter T in a database having a non-transitory computer readable medium,
- wherein the determining of the timespan T includes executing a processor coupled to the network for:
    - determining the type of the last user action, and
    - adaptively determining the corresponding value of the timespan parameter T based on the type of the last user action, and
- wherein the responding to the action includes recording information of the last user action to a violation log associated with the user, the log being stored in a non-transitory computer readable medium.

19. A non-transitory computer readable medium encoded with processing instructions for implementing the method of claim 1 using one or more processors.

\* \* \* \* \*